United States Patent [19]

Crouthamel

[11] 4,016,484
[45] Apr. 5, 1977

[54] SOLID STATE WELD TIMER

[76] Inventor: Reading H. Crouthamel, 742 High St., Bethlehem, Pa. 18018

[22] Filed: June 18, 1975

[21] Appl. No.: 587,873

[52] U.S. Cl. .................... 323/22 SC; 219/131 WR
[51] Int. Cl.² .......................................... G05F 1/56
[58] Field of Search .......... 219/108, 111, 114, 115, 219/131 R, 131 WR; 323/22 SC, 24

[56] References Cited

UNITED STATES PATENTS

| 3,286,158 | 11/1966 | Thatcher | 323/22 SC |
| 3,365,654 | 1/1968 | Johnston | 323/22 SC |
| 3,395,334 | 7/1968 | Stein | 323/22 SC |
| 3,493,835 | 2/1970 | Hellmann | 323/24 |
| 3,783,367 | 1/1974 | Yamamoto et al. | 323/22 SC X |

*Primary Examiner*—William M. Shoop
*Attorney, Agent, or Firm*—William D. Stokes

[57] ABSTRACT

A solid state timer for controlling the duration of an A.C. excitation delivered to a load. A relay-tripped trigger pulse generator activates a rectangular waveform generator, whose adjustable duration output controls the gate of a silicon controlled rectifier. The rectifier controls a diode bridge circuit to switch a full wave excitation to the load for the duration of the rectangular waveform. The timer finds particular application in welding circuitry.

9 Claims, 2 Drawing Figures

SOLID STATE WELD TIMER

BACKGROUND OF THE INVENTION

This invention relates to A.C. power control circuitry and more particularly to a timer for driving a load such as a transformer for use in welding apparatus.

In resistance welding circuitry, a transformer is typically used to energize the welder electrodes. Prior art weld timer circuits for controlling the power supplied to the transformer have required the use of tubes, usually hydrogen thyratrons. Similar circuitry has been common in other areas where it is desired to control the delivery of large amounts of power for dissipation by a load.

Such circuitry has proved far from satisfactory. The thyratron tubes are extremely expensive, require long warm-up periods and waste large amounts of power in stand-by condition. In particular, the resultant weld timers have been heavy, bulky, expensive and unreliable.

SUMMARY OF THE INVENTION

It is therefore an object of the invention to improve circuitry for controlling the amount of A.C. power delivered to a laod;

It is yet another object of the invention to provide an improved weld timer for delivering A.C. power to a transformer for precise, selectable durations;

It is yet another object of the invention to reduce the physical size and power consumption of such circuitry.

These and other objects and advantages, which will become apparent, are accomplished by employing a solid state control circuit to direct operation of an A.C. switching circuit connected between a first A.C. input terminal and a first A.C. output terminal. The second A.C. output terminal is connected in common with the second A.C. input terminal. Upon actuation, a trigger pulse generator in the control circuit provides a trigger pulse to activate a rectangular waveform generator. The rectangular waveform generator then activates the A.C. switching circuit, permitting a full wave A.C. signal to appear across the two output terminals for the duration of the rectangular waveform.

BRIEF DESCRIPTION OF THE DRAWINGS

The preferred mode of practicing the invention will now be described with reference to the drawings of which.

DETAILED DESCRIPTION OF THE PREFERRED EMBODIMENT OF THE INVENTION

Figure 1:
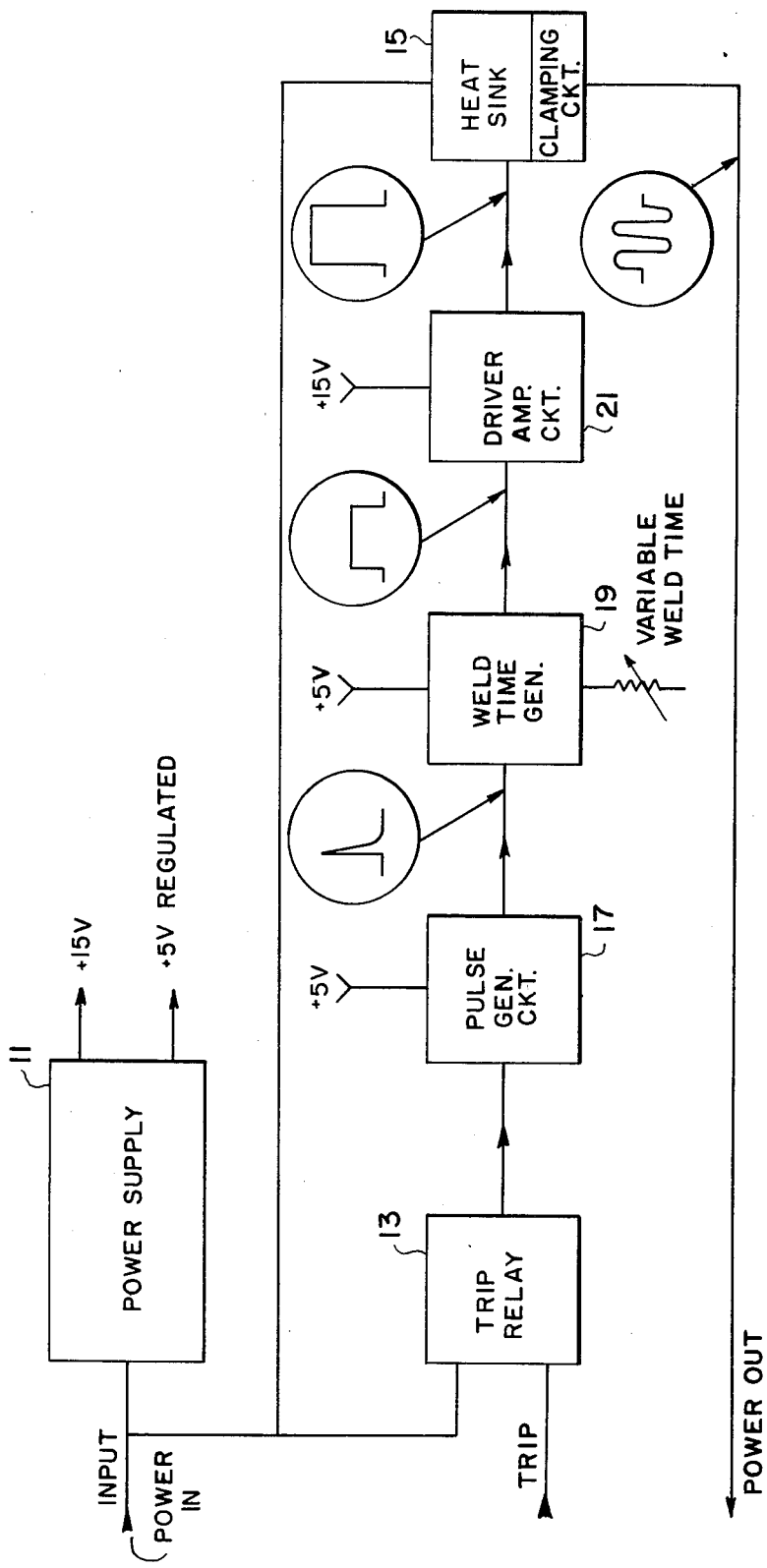
FIG. 1 is a functional block diagram illustrating the scheme of the preferred embodiment of the invention and waveforms at various points in the operation of the preferred embodiment.

The approach of the invention is illustrated in FIG. 1. Input power is supplied to a power supply 11 which provides positive output voltages for use by other components. The input power is also supplied to a trip relay 13 and a heat-sinked switching circuit 15.

When the trip relay 13 is energized it activates the timing portion of the circuitry including a pulse generator circuit 17, a timing waveform generator 19 and a driver amplifier 21. The pulse generator 17 produces a pulse of proper shape and amplitude to trigger the timing generator 19. The generator 19 responds by producing a rectangular waveform of a selected duration. This pulse is amplified by the driver amplifier 21 and used to control switching of the power inputted to the heat-sinked switching circuit 15.

Figure 2:
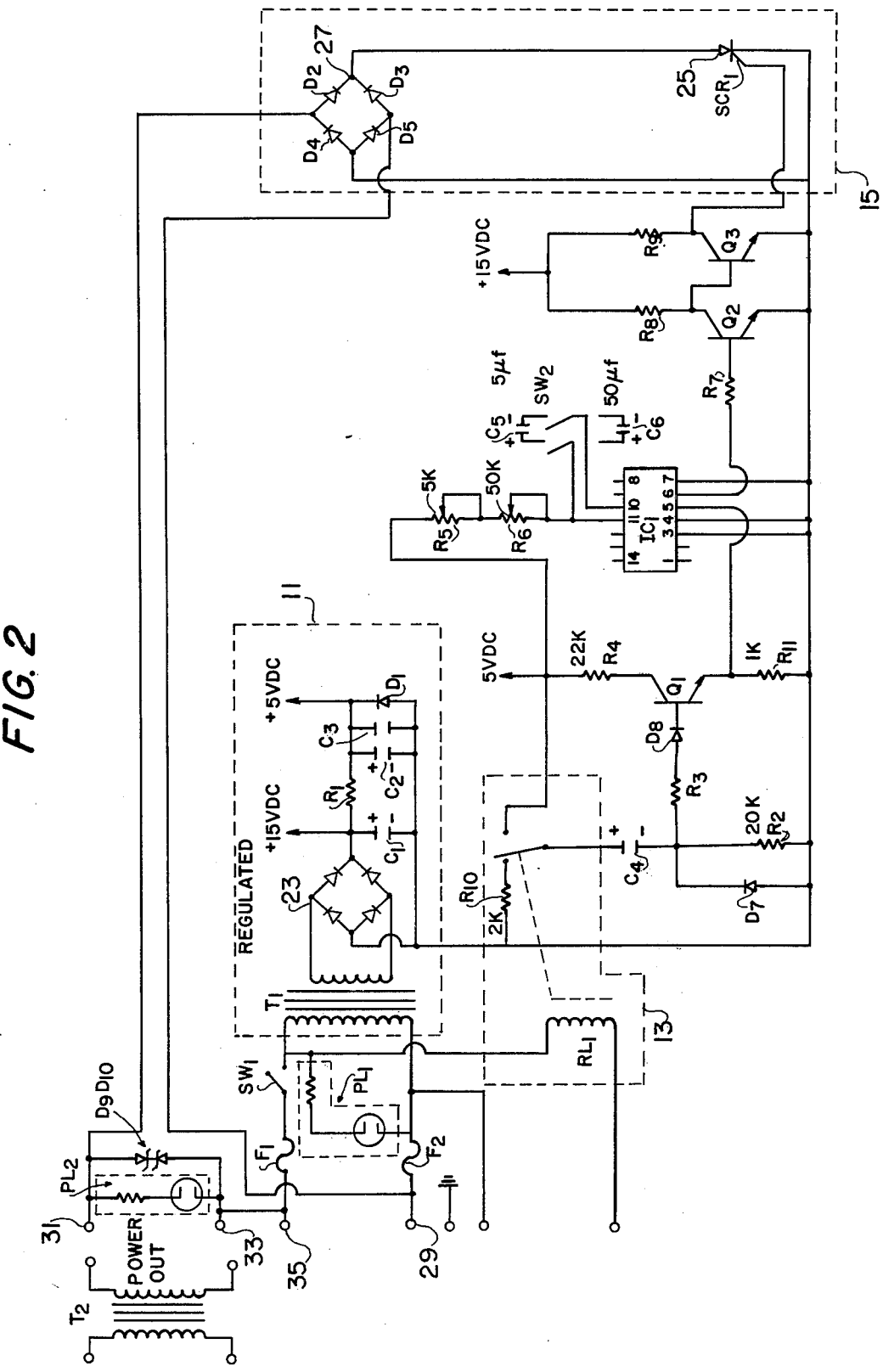
FIG. 2 is a schematic circuit diagram of the preferred embodiment of the invention.

A circuit adapting the approach of the invention to 60 Hz, 115 volt A.C. operation is illustrated in FIG. 2. When a switch $SW_1$ is closed, input power is supplied to the rest of the circuitry. A pilot lamp assembly $PL_1$ indicates power-on, and two fuses $F_1$ and $F_2$ provide input protection.

The power supply 11 is activated when the switch $SW_1$ is closed. The supply 11 includes a voltage step-down transformer $T_1$ supplying a full wave rectifier 23, which rectifies the reduced voltage signal. This reduced voltage signal is then applied to a capacitor $C_1$, resulting in a 15 volt D.C. bias voltage. The ungrounded terminal of the capacitor $C_1$ is then connected via a resistor $R_1$ to a second capacitance provided by parallel capacitors $C_2$, $C_3$. Placing a 5 volt zener diode $D_1$ in parallel with this second capacitance $C_2$, $C_3$ provides a regulated 5 volt D.C. output voltage.

The closing of the switch $SW_1$ also supplies energy to the trip relay 13, which comprises a single-pole-double-throw relay $RL_1$. Manual closing of the switch $SW_1$ will activate the relay coil and in turn tripping of the trip will activate the pulse generator 17.

The pulse generator 17 includes a transistor $Q_1$ having its collector biased to the 5 volt output provided by the power supply 11 through a resistor $R_4$ and its emitter biased through a resistor $R_{11}$ to a common point. The base of the transistor $Q_1$ is connected to the first terminal of a capacitor $C_4$ through a resistor $R_3$ and a diode $D_8$. The first terminal of the capacitor $C_4$ is in turn connected to ground through a resistor $R_2$. The resistor $R_2$ is connected in parallel with a diode $D_7$.

The second terminal of the capacitor $C_4$, a resistor $R_{10}$ and the 5 volt D.C. supply are connected to the single-pole-double-throw relay $RL_1$ such that the capacitor is normally grounded through the resistor $R_{10}$. When the trip relay is closed, however, the capacitor $C_4$ is connected to the 5 volt supply.

Thus, the capacitor $C_4$ is normally discharged to ground through the resistor $R_6$. However, when the trip relay is activated, the capacitor $C_4$ is connected to the 5 volt supply, causing turn-on of the transistor $Q_1$. An output pulse then appears across the resistor $R_{11}$. The duration of this output pulse is determined primarily by the charging of the capacitor $C_4$ through the resistor $R_2$ in parallel with the resistor $R_{11}$, the transistor $Q_1$, the diode $D_8$, and resistor $R_3$. The diode $D_8$ prevents a negative spike, which is developed when the capacitor $C_4$ is discharged through the resistor $R_{10}$, from being coupled capacitively through the transistor $Q_1$.

The output pulse across the resistor $R_{11}$ is supplied to an integrated circuit $IC_1$ connected to operate as a one-shot multivibrator. In the preferred embodiment, the integrated circuit $IC_1$ is an Integrated Circuit No. 72141, and the emitter of the pulse generator transistor $Q_1$ is connected to terminal 5 of the integrated circuit as illustrated. Bias is supplied to the integrated circuit $IC_1$ through two variable resistors $R_5$, $R_6$ connected in series. Additionally two capacitors $C_5$, $C_6$ are connected in conjunction with a double-pole, double-throw switch $SW_2$, which connects to the integrated circuit $IC_1$. By varying the value of the resistors $R_5$, $R_6$ and switching either capacitor $C_5$, $C_6$ into the circuit, a rectangular waveform of a duration varying from 50 milliseconds up to several minutes may be outputted by the integrated circuit $IC_1$.

This rectangular waveform is then supplied via a resistor $R_7$ to two cascaded transistors $Q_2$, $Q_3$. These transistors are biased by the 15 volt output of the power supply 11. The output of the second transistor $Q_3$ is utilized to trigger the gate of a silicon controlled rectifier (SCR) 25 in the heat-sink switching circuit 15. Besides providing necessary gain, the configuration of the transistors $Q_2$, $Q_3$ provides necessary isolation between the rectangular waveform generator circuit $IC_1$ and the heat-sink circuit 15.

As shown, the anode of the SCR 25 is connected to the two cathodes of two diodes $D_2$, $D_3$ making up a diode bridge 27. The other two diodes in the bridge $D_4$, $D_5$ have their respective anodes connected to the cathode of the SCR, which is connected to the D.C. common point. Thus, two cathodes of the diodes $D_2$ $D_3$ are connected to the two anodes of the diodes $D_4$, $D_5$ when the SCR 25 is triggered.

The cathode-anode connection of two of the diodes $D_3$, $D_5$ is supplied with a direct connection to one of the input power terminals 29. The cathode-anode connection of the other two diodes $D_2$, $D_4$ comprises one output terminal 31 of the timer. The other output terminal 33 is connected directly to the second input terminal 35.

Operation of the heat sink circuit is governed by the SCR 25. When the SCR 25 is triggered, output power will be delivered to the load, for example a transformer $T_2$, for the period of the gating rectangular wave output from the driver transistor $Q_3$. The heat sink circuit 15 provides a 360° sinusoidal output waveform with very low distortion.

Finally, a zener clamp circuit comprising two opposing zener diodes $D_9$, $D_{10}$ is connected between the output terminals 31, 33 to prevent high voltage transients at the load from damaging the diode bridge 27 or the SCR 25. Additionally, a pilot lamp assembly $PL_2$ may be provided across the output terminals 31, 33.

An illustrative list of component values for implementing the preferred embodiment follows. Modifications of values for various applications would of course be within the ability of one skilled in the art and enabled by this disclosure.

The above described invention is particularly adapted to perform as a weld timer. Compared to weld timers known in the prior art, the above detailed circuitry offers a simpler design which is much easier to maintain and trouble shoot. Weld consistency over extended periods is considerably improved. Comparable tube versions weigh 70-80% more, occupy 75% more volume and exhibit a 90% greater temperature rise during welding than a timer constructed according to the preferred embodiment of the invention. With respect to power capability, the preferred embodiment requires approximately 10 watts, while prior tube versions average from 160-225 watts in stand-by. Moreover, power loss during weld time in the preferred embodiment is held to a minimum by the method in which the SCR and heat sink diodes are utilized. Additionally, the preferred embodiment can supply realistic currents up to approximately 200 A (avg.), 1000 A (pk) for 1 second and can be switched by merely changing five components on the heat sink.

The power control timer circuit as illustrated above may find use in many applications other than welding. In addition many modifications in the preferred embodiment of the invention may be made without departing from the spirit of the invention. Therefore, it is to be understood that, within the scope of the appended claims, the invention may be practiced other than as specifically described.

What is claimed is:

1. A power control circuit for supplying a fixed duration excitation across first and second output terminals from first and second input terminals supplied with a continuous A.C. signal comprising:
   conductor means for connecting said first output terminal and said first input terminal;
   means for generating a trigger pulse, said means-comprising:
      a single pole terminal switchable between first and second throw terminals; said pole terminal normally being connected to said first throw terminal;
      trip relay means for switching said pole between said first and second throw terminals;
      a capacitor connected to said pole terminal;
      a resistor connected between said first throw terminal and ground;
      a voltage bias source connected to said second throw terminal; and
      transistor circuit means having an output terminal and connected to said capacitor for generating an output pulse at said output terminal in response to connection of said capacitor to said bias source by said trip relay means;
   means for generating a rectangular waveform in response to generation of a said trigger pulse, said means including means for selectively setting the duration of said rectangular waveform; and
   switching means connected between said second input terminal and said second output terminal for producing a full wave A.C. excitation across said first and second output terminals for the duration of a said rectangular waveform.

2. The power control circuit of claim 1 wherein said rectangular waveform generating means comprises monostable multivibrator means comprising:
   an intergrated circuit chip having a first input terminal connected to the output terminal of said transistor circuit means and second and third input terminals; and
   variable potentiometer means connected between said voltage bias source and said second input terminal;
   capacitor means; and
   means for connecting said capacitor means between said second input terminal and said third terminal.

3. The power control circuit of claim 2 wherein said switching means includes:
   a diode bridge having a first diode-diode junction connected to said second input and a second diode-diode junction connected to said second output terminal and third and fourth diode-diode junctions; and
   electronic switch means for connecting said third and fourth diode-diode junctions to a common point for the duration of said rectangular pulse.

4. The power control circuit of claim 3 wherein said voltage bias source comprises means for generating a bias voltage from said input signal.

5. The power control circuit of claim 4 further including clamping circuit means connected across said output terminals for protecting said diode bridge and electronic switch means from load transients.

6. A weld timer for supplying power to first and second terminals of a welding electrode transformer from an alternating line current supplied to first and second input terminals comprising:
   power supply means for developing a bias voltage;
   pulse generating means including a timing capacitor for producing a uniform trigger pulse upon connection of said capacitor to said bias voltage;
   trip relay means energized by said line current and actuable for connecting said capacitor to said bias voltage;
   means for generating a rectangular waveform of selected duration in response to production of a said trigger pulse;
   means for amplifying said rectangular waveform;
   a diode bridge having a first diode-diode junction connected to said second input terminal and a second diode-diode junction connected to said second welding transformer terminal; and thrid and fourth diode-diode junctions; and
   electronic switch means for connecting the third and fourth diode-diode junctions of said bridge to a common point for the duration of said amplified rectangular waveform.

7. A power control circuit for supplying a fixed duration excitation across first and second output terminals from first and second input terminals supplied with a continuous A.C. signal comprising:
   conductor means for connecting said first output terminal and said first input terminal;
   switch means switchable between a first switch terminal and a second switch terminal, said switch means cooperable with said first and second input terminals for maintaining said switch means at its first switch terminal by the continuous A.C. signal applied across said first and second terminals;
   trip means activatable for switching said switch means to its second switch terminal;
   means for generating a trigger pulse responsive to said switch means switched to its second switch terminal;
   means for generating a rectangular waveform in response to generation of a said trigger pulse; and
   switching means connected between said second input terminal and said second output terminal for producing a full wave A.C. excitation across said first and second output terminals for the duration of a said rectangular waveform.

8. A power control circuit according to claim 7 and further including:
   capacitor means;
   voltage source means connectable to said capacitor means for charging thereof responsive to said switch means switched to said second switch terminal;
   voltage drain means connectable to said capacitor means for discharging thereof responsive to said switch means switched to said first switch terminal; and
   wherein said trigger pulse generating means includes:
   transistor circuit means having an output terminal and connected to said capacitor means for generating an output pulse at said output terminal in response to connection of said capacitor means to said voltage source by said trip relay means.

9. A power control circuit according to claim 8 wherein said rectangular waveform generating means comprises monostable multivibrator means including settable resistor and capacitor means for selectively setting the duration of said rectangular waveform.

* * * * *